United States Patent
Dudha et al.

(10) Patent No.: US 10,990,736 B1
(45) Date of Patent: Apr. 27, 2021

(54) IMPLEMENTING A CIRCUIT DESIGN WITH RE-CONVERGENCE

(71) Applicant: Xilinx, Inc., San Jose, CA (US)

(72) Inventors: Chaithanya Dudha, San Jose, CA (US); Satyaprakash Pareek, San Jose, CA (US); Krishna Garlapati, Los Gatos, CA (US); Ashish Sirasao, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/821,465

(22) Filed: Mar. 17, 2020

(51) Int. Cl.
  G06F 30/30 (2020.01)
  G06F 30/337 (2020.01)
  G06F 30/327 (2020.01)
  G03F 1/70 (2012.01)
  G06F 30/31 (2020.01)
  G06F 119/12 (2020.01)

(52) U.S. Cl.
  CPC .............. *G06F 30/337* (2020.01); *G03F 1/70* (2013.01); *G06F 30/31* (2020.01); *G06F 30/327* (2020.01); *G06F 2119/12* (2020.01)

(58) Field of Classification Search
  CPC ...... G06F 30/31; G06F 30/327; G06F 30/337; G03F 1/70
  USPC .............................. 716/51, 54, 101, 104, 132
  See application file for complete search history.

(56) References Cited

U.S. PATENT DOCUMENTS

| | | | |
|---|---|---|---|
| 5,726,996 A * | 3/1998 | Chakradhar et al. | G01R 31/318392 714/724 |
| 7,818,700 B2 * | 10/2010 | Muller-Brahms | G01R 31/31727 716/123 |
| 8,042,085 B2 * | 10/2011 | Rahim et al. | G06F 30/327 716/132 |
| 8,984,462 B1 | 3/2015 | Das et al. | |
| 9,646,126 B1 | 5/2017 | Lu et al. | |
| 9,836,568 B1 | 12/2017 | Ganusov et al. | |
| 9,965,581 B1 | 5/2018 | Das et al. | |
| 10,289,786 B1 | 5/2019 | Dudha et al. | |
| 10,303,648 B1 | 5/2019 | Das et al. | |
| 10,303,833 B1 | 5/2019 | Gayasen et al. | |
| 10,387,600 B2 | 8/2019 | Dudha et al. | |
| 10,606,979 B1 | 3/2020 | Sun et al. | |
| 10,678,983 B1 | 6/2020 | Sun et al. | |

* cited by examiner

*Primary Examiner* — Sun J Lin
(74) *Attorney, Agent, or Firm* — Kevin T. Cuenot

(57) ABSTRACT

Implementing a circuit design can include detecting, using computer hardware, a re-convergent section of a circuit design, masking, using the computer hardware, a sequential circuit element of the re-convergent section located between a start and an end of the re-convergent section, and performing, using the computer hardware, an optimization operation on combinatorial logic of the re-convergent section to create optimized combinatorial logic. Using the computer hardware, the optimized combinatorial logic of the re-convergent section can be mapped. Further, the re-convergent section can be modified subsequent to the mapping to match timing of the re-convergent section prior to the masking.

20 Claims, 13 Drawing Sheets

200

---

Detect, using computer hardware, a re-convergent section of a circuit design
202

---

Mask, using the computer hardware, one or more sequential circuit elements of the re-convergent section located between a start and an end of the re-convergent section
204

---

Perform, using the computer hardware, an optimization operation on combinatorial logic of the re-convergent section to create optimized combinatorial logic
206

---

Map, using the computer hardware, the optimized combinatorial logic of the re-convergent section
208

---

Modify, using the computer hardware, the re-convergent section subsequent to the mapping to match timing of the re-convergent section prior to the masking.
210

FIG. 2

IMPLEMENTING A CIRCUIT DESIGN WITH RE-CONVERGENCE

TECHNICAL FIELD

This disclosure relates to integrated circuits (ICs) and, more particularly, to processing a circuit design that has re-convergence for implementation in an IC.

BACKGROUND

Electronic design automation (EDA) refers to computer-based tools used for designing electronic systems such as integrated circuits. A collection of EDA tools work in coordination to implement a "design flow." A design flow typically includes various stages such as synthesis, placement, and routing. A different EDA tool may perform each of the stages of the design flow.

Synthesis refers to the process of converting an abstract, programmatic description of a circuit into a low-level design implementation. The abstract, programmatic description of the circuit, which is typically specified in a hardware description language, describes behavior of the circuit and may also be referred to as a "behavioral description." The low-level design implementation generated through synthesis is typically specified as inter-connected logic gates referred to as a logical network list or "netlist." Synthesis may also include mapping, which matches the logic gates of the circuit design to different types of physical circuit blocks available in the particular IC in which the circuit design is to be implemented (e.g., the target IC).

Placement refers to the process of assigning elements of the synthesized circuit design to particular instances of circuit blocks and/or resources having specific locations on the target IC. Routing refers to the process of adding and/or determining wires to connect the placed circuit blocks of the circuit design.

SUMMARY

In one aspect, a method can include detecting, using computer hardware, a re-convergent section of a circuit design, masking, using the computer hardware, a sequential circuit element of the re-convergent section located between a start and an end of the re-convergent section, and performing, using the computer hardware, an optimization operation on combinatorial logic of the re-convergent section to create optimized combinatorial logic. The method can include mapping, using the computer hardware, the optimized combinatorial logic of the re-convergent section and modifying, using the computer hardware, the re-convergent section subsequent to the mapping to match timing of the re-convergent section prior to the masking.

In another aspect, a system includes a processor configured to initiate operations. The operations can include detecting a re-convergent section of a circuit design, masking a sequential circuit element of the re-convergent section located between a start and an end of the re-convergent section, and performing an optimization operation on combinatorial logic of the re-convergent section to create optimized combinatorial logic. The operations can include mapping the optimized combinatorial logic of the re-convergent section and modifying the re-convergent section subsequent to the mapping to match timing of the re-convergent section prior to the masking.

In another aspect, a computer program product includes one or more computer readable storage media, and program instructions collectively stored on the one or more computer readable storage media. The program instructions are executable by computer hardware to initiate operations. The operations can include detecting a re-convergent section of a circuit design, masking a sequential circuit element of the re-convergent section located between a start and an end of the re-convergent section, and performing an optimization operation on combinatorial logic of the re-convergent section to create optimized combinatorial logic. The operations can include mapping the optimized combinatorial logic of the re-convergent section and modifying the re-convergent section subsequent to the mapping to match timing of the re-convergent section prior to the masking.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates an example method of performing certain operative features of the system of FIG. 1.

DETAILED DESCRIPTION

Figure 1:
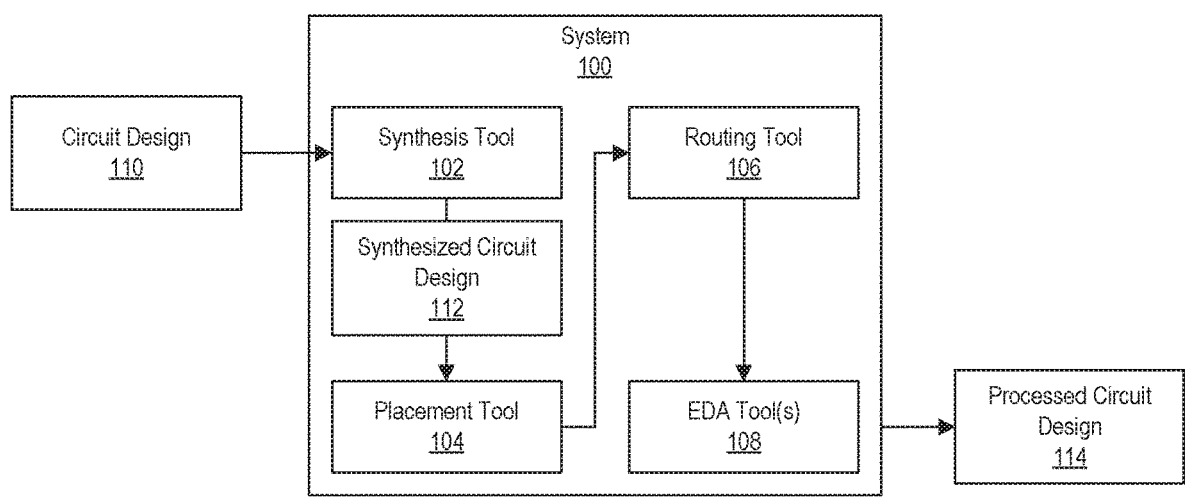
FIG. 1 illustrates an example of a system for implementing a circuit design.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to processing a circuit design that has re-convergence for implementation in an IC. Some types of circuit designs exhibit a design pattern called "re-convergence." In general, re-convergence refers to a property of a circuit design (or circuit) where a plurality of signal paths converge to fewer signal paths. A re-convergent section of a circuit design is characterized by having a number of inputs that exceeds the number of outputs for the portion of the circuit design referred to as "re-convergent." Circuit designs (or circuits) that implement or are found in convolutional neural networks (CNN) and/or machine learning (ML) applications often exhibit re-convergence. In the usual case, such circuit designs employ re-convergence in combination with pipelining. The pipelining, which helps the circuit design achieve a higher target frequency of operation, may be extensive.

Within CNN and/or ML circuit designs, the inner most circuit blocks tend to be implemented as re-convergent circuit blocks with extensive pipelining. While the additional pipelining registers added to the circuit design may allow the circuit design to achieve higher operating frequencies, the pipeline registers also constrain certain operations performed by the Electronic Design Automation (EDA) tools. In the case of synthesis, for example, pipeline registers may prevent the synthesis tool from achieving a higher quality of result. The synthesis tool views each pipeline register as a boundary that is not crossed when performing optimization operations on the circuit design. For example, the synthesis tool will only perform certain optimizations within signal path(s) of a segment, where that segment is bounded on each end by one or more synchronous circuit elements (e.g., a register or registers). The synthesis tool may perform optimization operations on a segment of the circuit design independently of the other segments such that optimization operations do not extend beyond segment boundaries (e.g., pipeline registers).

In accordance with the inventive arrangements described within this disclosure, the synthesis tool is capable of performing optimization operations that take into consideration a larger context of the circuit design. In performing certain optimizations, for example, a re-convergent section of the circuit design may be identified that spans more than one segment. The synthesis tool effectively removes and/or ignores certain synchronous circuit elements (e.g., registers) in the re-convergent section. By doing so, the re-convergent section is effectively transformed into a single, larger segment. The synthesis tool is capable of performing the optimization operations in the larger context of the re-convergent section, which spans two or more segments that would have otherwise been optimized independently of one another. This facilitates more efficient optimization of the circuit design such that the resulting circuit design requires less area for implementation. Once the optimizations are complete, the synthesis tool is capable of inserting one or more synchronous circuit elements into the re-convergent section as may be required to ensure that timing is preserved.

The inventive arrangements described within this disclosure are capable of generating a circuit design and resulting circuitry with an improved quality of result compared to conventional implementation techniques. In one aspect, processing a circuit design in accordance with the inventive arrangements may result in a circuit design and/or circuitry that requires less area on the target IC than using conventional implementation techniques. In another aspect, processing a circuit design in accordance with the inventive arrangements may result in a circuit design and/or circuitry with improved timing (e.g., circuitry capable of operating at a higher clock frequency).

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a system 100 for implementing a circuit design. System 100 illustratively includes a synthesis tool 102, a placement tool 104, a routing tool 106, and one or more other optional EDA tool(s) 108. In one aspect, synthesis tool 102, placement tool 104, routing tool 106, and EDA tool(s) 108 are operatively coupled or communicatively linked so as to operate in coordination with one other to implement a design flow through which a circuit design 110 may be processed. In an example implementation, system 100 is implemented as a set of computer system instructions (software) that execute on one or more processors such as processor(s) 806 of computer 802 described with reference to FIG. 8. In other examples, system 100 can be implemented as dedicated circuitry or as a combination of circuitry and software.

System 100 is capable of receiving circuit design 110 as input. Circuit design 110 may be specified using a hardware description language. Examples of hardware description languages include, but are not limited to, VHDL and Verilog. Synthesis tool 102 is capable of synthesizing circuit design 110 to convert circuit design 110 from an HDL implementation to a netlist, e.g., a gate level implementation illustrated as synthesized circuit design 112. Placement tool 104 is capable of performing placement to assign elements of the synthesized circuit design to particular instances of circuit blocks and/or resources having specific locations on a target IC. Routing tool 106 is capable of routing the placed circuit design. EDA tool(s) 108, if included, may perform additional operations. The additional operations may include, but are not limited to, preparing the circuit design for implementation as hardware within an IC. For example, the additional operations may include bitstream generation.

System 100, subsequent to performing one or more or all of synthesis, placement, routing, and/or other operations, outputs processed circuit design 114. Processed circuit design 114 may be implemented in an IC. In one aspect, processed circuit design 112 may be implemented within an Application Specific IC (ASIC) that includes hardwired circuitry. In another aspect, processed circuit design 112 may be implemented in a programmable IC such as a field programmable gate array that includes programmable circuitry or logic. In still another aspect, processed circuit design 112 may be implemented within an IC that includes dedicated or hardwired circuitry and programmable circuitry or logic.

In one aspect, synthesis tool 102 is capable of performing combinatorial logic optimization. Combinatorial logic optimization refers to a process in which synthesis tool 102 determines or generates an equivalent representation of one or more portions or all of circuit design 110. The equivalent representation is one that may be reduced in size and/or complexity. In performing combinatorial logic optimization, synthesis tool 102 is capable of observing one or more constraints that guide the process. The constraints may include meeting a predetermined delay or timing and/or minimizing the area of the IC needed to implement the circuit design or portion of the circuit design being optimized.

In one aspect, synthesis tool 102 is capable of performing the optimization using Boolean algebra. Synthesis tool 102 is capable of using any of a variety of different techniques known in the art for minimizing Boolean algebraic expressions. The particular minimization technique used by synthesis tool 102 is not intended to be limiting of the inventive arrangements described within this disclosure.

Prior to performing optimization operations, synthesis tool 102 is capable of detecting a re-convergent section of circuit design 110. The re-convergent section includes two or more consecutive segments. The re-convergent section may be characterized as having fewer outputs than inputs. Each segment is formed of one or more signal paths bounded by one or more segment start synchronous circuit elements and one or more segment end synchronous circuit elements. Synthesis tool 102 effectively removes and/or ignores selected synchronous circuit elements in the re-convergent section. By doing so, synthesis tool 102 effectively creates a re-convergent section of circuit design 110 bounded by synchronous circuit elements at inputs and outputs and that includes combinatorial logic between. As such, synthesis tool 102 is capable of performing optimization operations on the plurality of consecutive segments of the re-convergent section as if the plurality of segments were a single, larger segment. In response to completing the optimization operations, synthesis tool 102 is capable of inserting one or more synchronous circuit elements as may be required to preserve and/or improve the timing of the original circuit design.

FIG. 2 illustrates an example method 200 of performing certain operative features of the system of FIG. 1. More particularly, the example operations of FIG. 2 may be performed by synthesis tool 102 of FIG. 1.

In block 202, the system is capable of detecting a re-convergent section of a circuit design. In block 204, the system is capable of masking one or more sequential circuit elements of the re-convergent section located between a start and an end of the re-convergent section. In one aspect, the re-convergent section of the circuit design is defined by a plurality of start sequential circuit elements and one or more end sequential circuit elements, where the number of start sequential circuit elements exceeds the number of end sequential circuit elements. Examples of sequential circuit elements include flip-flops and registers. In block 206, the system is capable of performing an optimization operation on combinatorial logic (e.g., un-clocked circuit elements) of the re-convergent section to create optimized combinatorial logic. In block 208, the system is capable of mapping the optimized combinatorial logic of the re-convergent section. In block 210, the system is capable of modifying the re-convergent section subsequent to the mapping to match timing (e.g., latency) of the re-convergent section prior to the masking. As noted, certain optimizations also may be implemented that improve timing.

In an example implementation, the system is capable of reverting the circuit design back to the original state, e.g., prior to performance of method 200, in the event the timing of the circuit design does not meet predetermined timing requirements or becomes worse than the original timing.

Figure 3A:
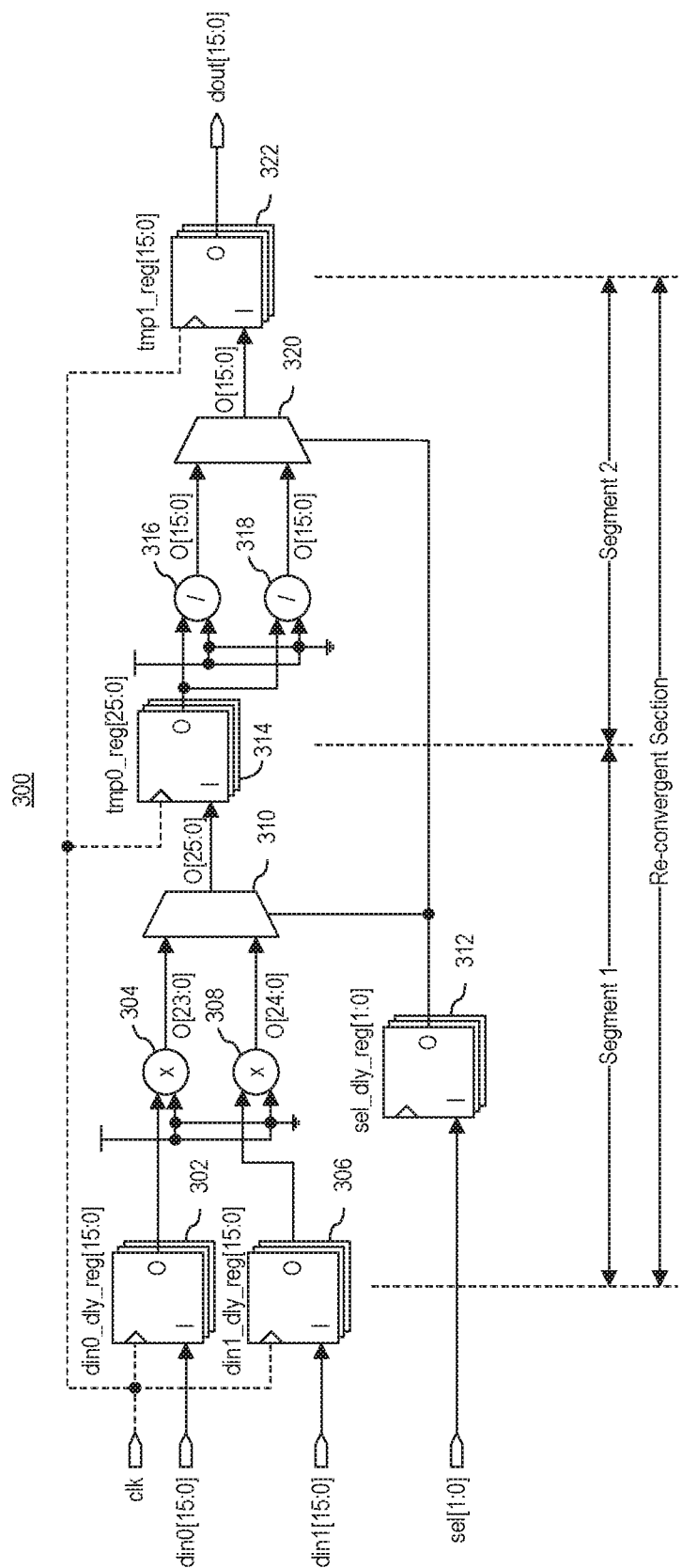
FIGS. 3A, 3B, and 3C depict circuit designs illustrating example operative features of the system of FIG. 1.
Figure 3B:
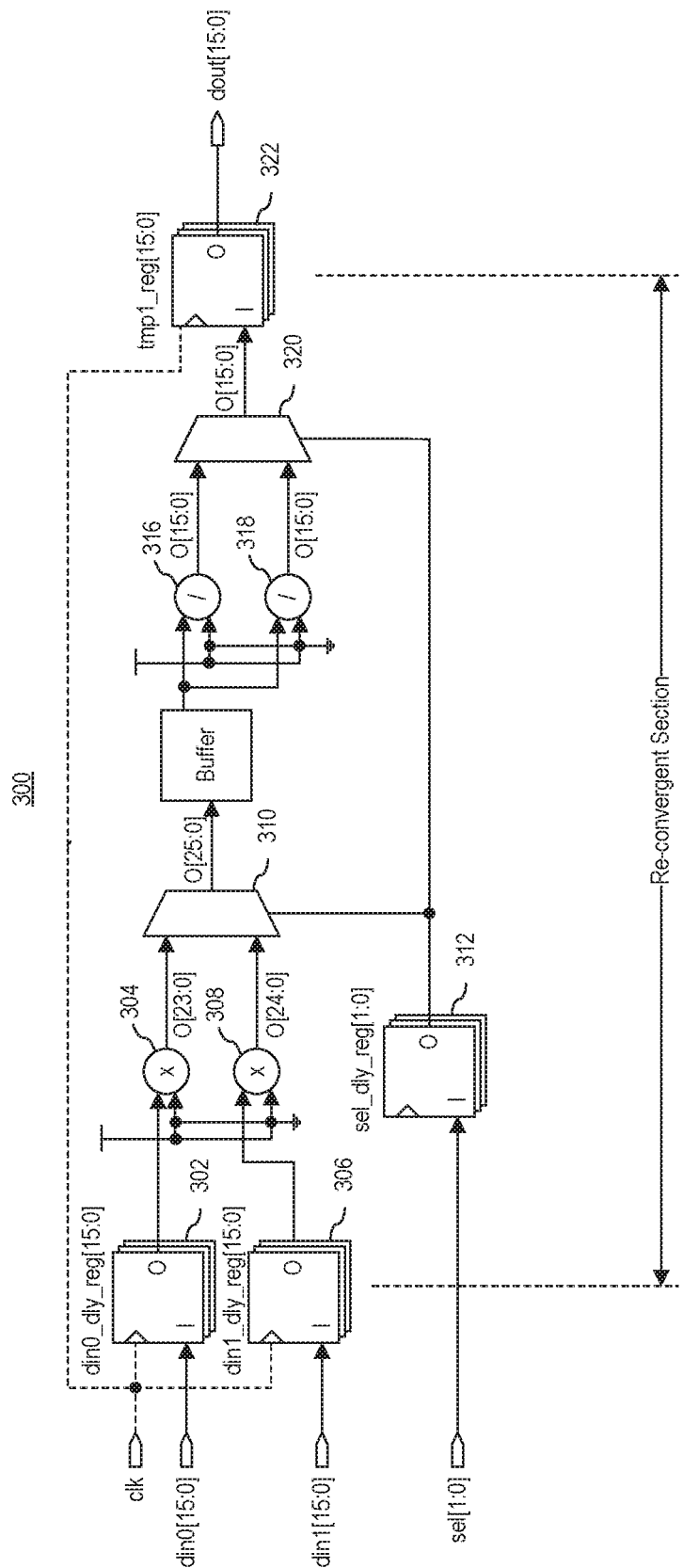
Figure 3C:
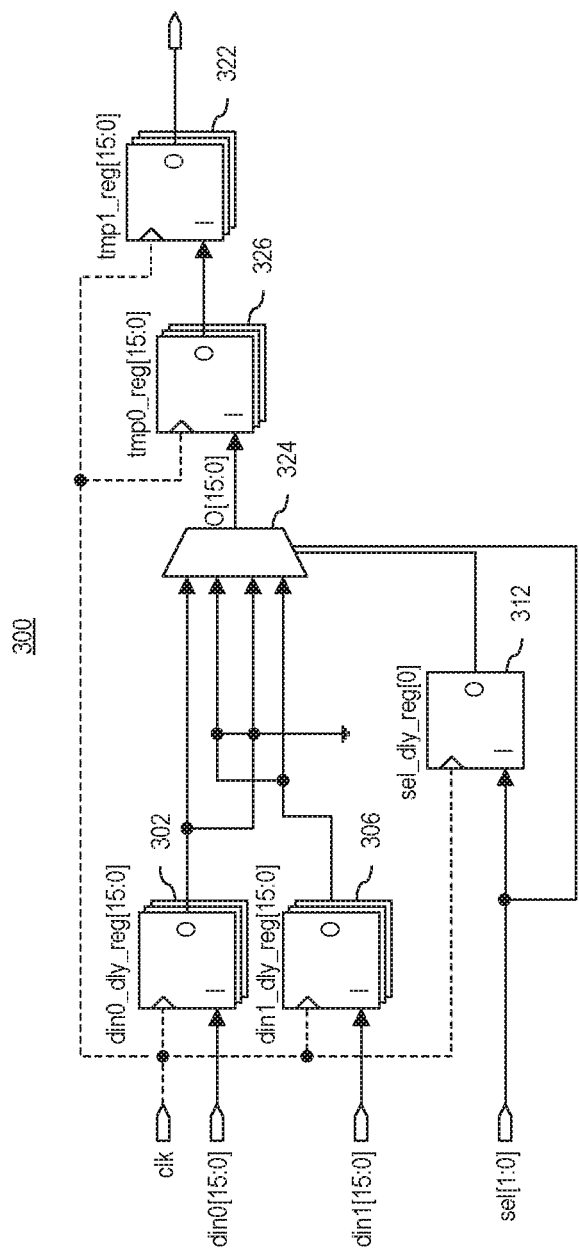

FIGS. 3A, 3B, and 3C depict circuit designs illustrating example operative features of the system of FIG. 1. FIG. 3A illustrates an example circuit design 300 prior to application of optimization operations as performed by system 100 of FIG. 1. FIG. 3B illustrates the state of circuit design 300 after performing a masking operation performed by system 100. FIG. 3C illustrates the state of circuit design 300 subsequent to application of the optimization operations performed by system 100.

In the example of FIG. 3A, circuit design 300 includes registers 302 coupled to multiplier 304; and, registers 306 coupled to multiplier 308. Multipliers 304 and 308 are coupled to multiplexer 310. Multiplexer 310 receives a select signal from registers 312. Multiplexer 310 is coupled to registers 314. Registers 314 are coupled to divider 316 and to divider 318. Divider 316 and divider 318 each is coupled to multiplexer 320. Multiplexer 320 is coupled to registers 322.

In the example of FIG. 3A, starting from the output dout[15:0], the system detects a re-convergent section by detecting a segment 2 followed by one or more other consecutive segments such as segment 1. Segment 2 is defined by a segment end sequential circuit element corresponding to registers 322 and a segment start sequential circuit element corresponding to registers 314. Segment 1 is defined by a segment end sequential circuit element corresponding to registers 314 (e.g., the segment start sequential circuit element of segment 2) and a segment start sequential circuit element corresponding to registers 302 and 306. Segment 1 includes 2 multipliers 304, 308 followed by 2 dividers 316, 318 in segment 2. Dividers 316 and 318 are chosen based on the select signal.

For purposes of discussion, the system traverses circuit design 300 from the outputs to the inputs (e.g., right to left). For purposes of discussion, the "start" and "end" circuit elements are named using the input(s) to output(s) direction with regard to signal flow as opposed to the direction of the system's traversal for analysis from output(s) to input(s).

In one aspect, the system is capable of traversing the input pins (e.g., data inputs) of the segment end sequential circuit element (register 322) backwards through circuit design 300. In the example of FIG. 3A, registers 322 are the segment end sequential circuit element(s) of segment 2 as well as the end sequential circuit element(s) (e.g., the end(s)) of the re-convergent section). In one aspect, the system is capable of detecting a re-convergent section of the circuit design as any portion of two or more consecutive segments in which the number of inputs for the re-convergent section exceeds the number of outputs of the re-convergent section. Consecutive segments refer to segments where the output sequential circuit element(s) of a segment are also the start sequential circuit elements of the next consecutive segment in the sequence from input to output.

While a re-convergent section has fewer outputs than inputs, in general, each constituent segment of a re-convergent section will have one or more of the following characteristics: the segment has fewer outputs than inputs; the segment includes two or more signal paths that converge or merge to fewer signal paths; and/or the segment has a same number of inputs as outputs regardless of whether two or more signal paths therein merge.

Merging signal paths may be detected by the system by traversing the signal paths and detecting a signal path from output to input that branches to two or more signal paths. In another aspect, the system is capable of detecting merging signal paths by detecting particular circuit elements such as a multiplexer, an XOR gate, or other circuit elements in the signal path that have more inputs than outputs. Multiplexers, XOR gates, and other circuit elements that have more inputs than outputs, for example, may not be required for re-convergence, but are indicative of convergent or merging signal paths in circuit designs.

In the example of FIG. 3A, the system traverses the input pins of registers 322 backwards to detect multiplexer 320 and continues to detect registers 314. Registers 314 are the segment start sequential circuit elements of segment 2. The system continues traversing the input pins of registers 314 backward through circuit design 300. Registers 314 serve as both the segment end sequential circuit elements of segment 1 and the segment start sequential circuit elements of segment 2. In traversing backward, the system detects multiplexer 310 and continues to then detect registers 302 and registers 306. Registers 302 and registers 306 are the segment start sequential circuit elements of segment 1 and also the start sequential circuit elements (e.g., start(s)) of the re-convergent section.

For purposes of illustration, the system determines that registers 302 and 306 mark the start of the re-convergent section. In one example, the system continues traversing beyond registers 302 and 306 into the next consecutive segment and determines that such segment includes no paths that converge and/or determines that the number of inputs to the segment preceding segment 1 are fewer than the outputs (where the outputs correspond to the inputs of segment 1), either of which or the combination may be a stopping condition for purposes of re-convergent section detection. Other stopping conditions may also be used such as stopping after a predetermined number of segments (e.g., limiting the number of segments in a re-convergent section).

In the example of FIG. 3A, the re-convergent section has more inputs (e.g., 32 input registers or "inputs" corresponding to registers 302, 306) than outputs (e.g., 16 output registers or "outputs" corresponding to registers 322). Each of segments 1 and 2 include signal paths that converge. Further, in looking at segments 1 and 2 individually, segment 1 has more inputs (e.g., 32 corresponding to registers 302, 306) than outputs (e.g., 16 output registers or "outputs" corresponding to registers 314); and segment 2 has the same number of inputs (e.g., 16 corresponding to registers 314) as outputs (e.g., 16 corresponding to registers 322).

The system is capable of masking sequential circuit element(s) of circuit design 300 located between the end sequential circuit element(s) and the start sequential circuit element(s) of the re-convergent section. In one aspect, the system is capable of masking each sequential circuit element of circuit design 300 located between the start sequential circuit element(s) and the end sequential circuit element(s) of the re-convergent section. The system may apply the masking operation only to the data signal paths and not to the signal paths corresponding to select signals. Referring to the example of FIG. 3A, the system masks registers 314 but not registers 302, 306, and 322 corresponding to start and end synchronous circuit elements, and not registers 312 corresponding to the select signal path.

Masking a synchronous circuit element refers to any of a variety of different procedures that render the synchronous circuit element either invisible to the EDA tool or to appear as a circuit element that behaves as combinatorial logic to the EDA tool. One way of masking a synchronous circuit element is to remove the synchronous circuit element from the circuit design and simply connect the input pin of the removed element to the output pin of the removed element via a short circuit or wire. Another technique for masking a synchronous circuit element is to replace the synchronous circuit element with a buffer that is not a synchronous circuit element (e.g., not clocked).

FIG. 3B illustrates an example implementation of circuit design 300 after performing the masking. It should be appreciated that as part of performing the masking, the system is capable of determining timing of all of the signal paths of circuit design 300 prior to the masking and persisting that information for later use and/or recall. Further, the system is capable of storing the location of each of the synchronous circuit elements removed from circuit design 300 and/or the state of circuit design 300 from FIG. 3A should the system need to reverse any changes made. FIG. 3B illustrates that segments 1 and 2 have been effectively merged into a single, larger segment for purposes of optimization.

Once synchronous circuit element(s) separating segments (e.g., registers 314) are masked, the system is capable of performing an optimization operation on the combinatorial logic of the re-convergent section. For example, the system may perform Boolean logic optimizations to reduce the amount of circuitry included in the re-convergent section. In the example of FIG. 3B, the system is capable of applying the optimization operations across the entirety of the re-convergent section. This means that the system applies the optimization operations on all combinatorial circuitry between the start synchronous circuit elements (registers 302, 306) and the end synchronous circuit elements (registers 322) of the re-convergent section.

Were conventional synthesis techniques to be used, the system would attempt to apply optimization operations only to segment 2 and then separately and independently to segment 1. With the conventional approach, the degree of optimization obtained in the reduction in size in the circuitry would be less than that achievable by masking registers 314 and treating segment 1 and segment 2 as one large section available for optimization operations. The system is further capable of mapping the optimized combinatorial logic of the re-convergent section. The system may also modify the re-convergent section subsequent to the mapping to match timing (e.g., latency) of the re-convergent section that existed prior to the masking.

FIG. 3C illustrates an example of circuit design 300 subsequent to optimizations performed by synthesis tool 102. In the example of FIG. 3C, registers 302 and 306 are coupled to a multiplexer 324. Multiplexer 324 is coupled to registers 326. Registers 326 are coupled to registers 322. Circuit design 300 of FIG. 3C may be implemented using less combinatorial logic and fewer registers than circuit design 300 of FIG. 3A and, as such, is reduced in size relative to circuit design 300 of FIG. 3A. For example, the number of registers is reduced from 76 in the example of FIG. 3A to 65 in the example of FIG. 3C. It should be appreciated that the number of registers and amount of combinatorial logic used to implement each of the various example circuits described within this disclosure may vary based on a variety of factors including, but not limited to, the particular implementation tools used and/or the architecture of the target IC. Still, the examples illustrate the reduction in area that may be achieved.

The combinatorial logic has been optimized across two segments to use a 4:1 multiplexer and a 2-bit select signal. While registers 302, 306, and 322 of the data signal paths remain in the circuit design, other circuit elements such as registers 314; multipliers 304 and 308; multiplexer 310; multiplexer 320; and dividers 316 and 318 have been removed and replaced with multiplexer 324 via the optimization operations performed on combinatorial logic subsequent to masking.

Registers 326 have been added to ensure that the timing, e.g., latency, of circuit design 300 of FIG. 3C has the same timing as circuit design 300 of FIG. 3A. In the example of FIG. 3C, the inserted registers are inserted at the end, e.g., the output, of the optimized combinatorial logic and prior to the end sequential circuit element of the re-convergent section (e.g., the right-most register(s) of the re-convergent section). The system further ensures that timing (e.g., latency) of the select signal path(s) also match that of the original circuit design 300 prior to performing the optimization operations.

Figure 4A:
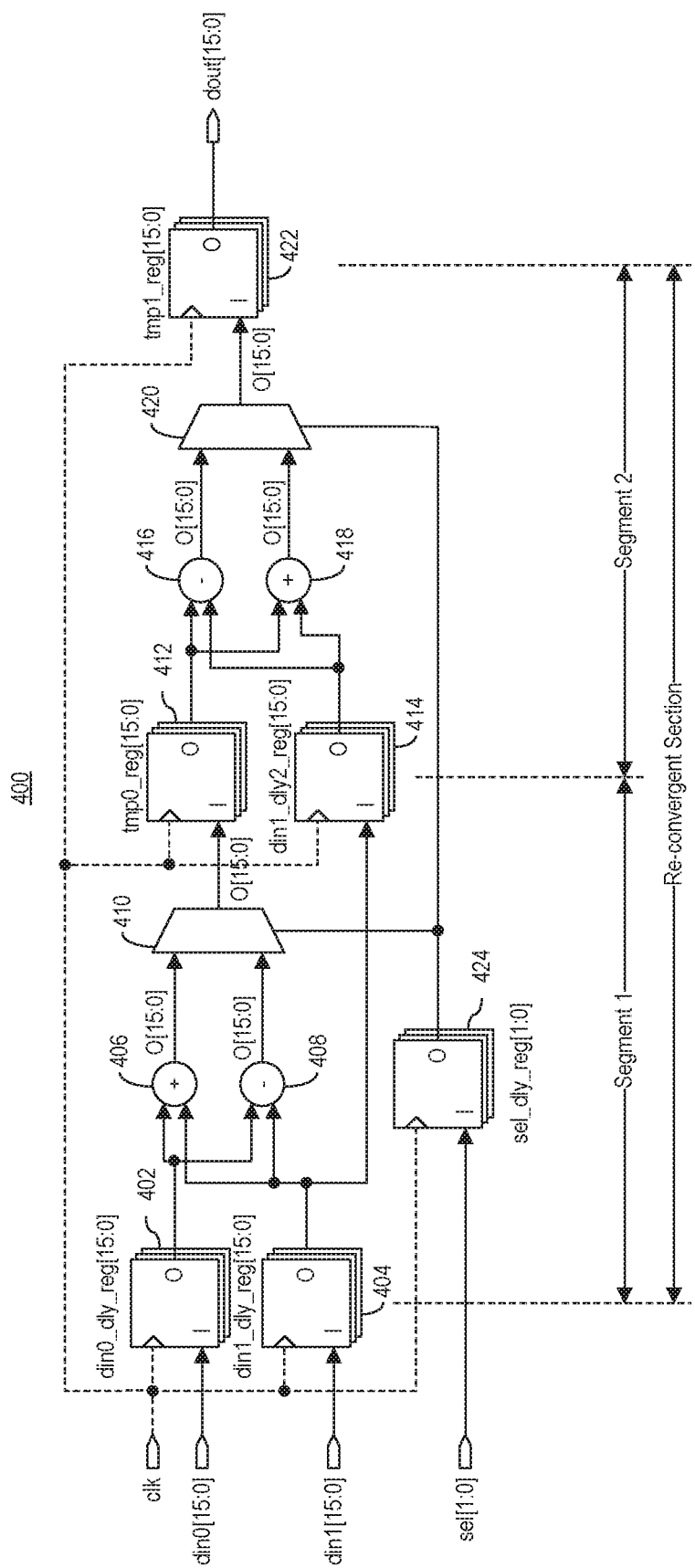
FIGS. 4A, 4B, and 4C depict circuit designs illustrating example operative features of the system of FIG. 1.
Figure 4B:
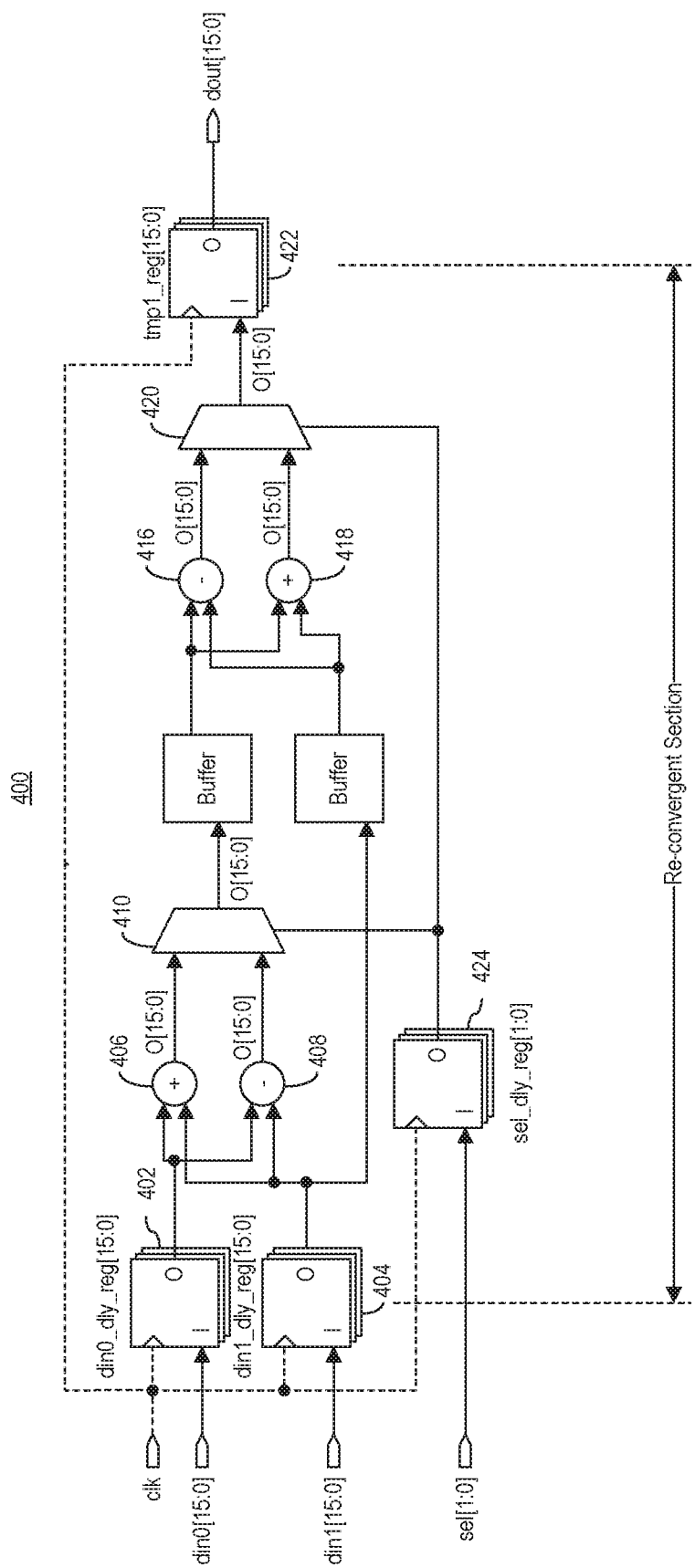
Figure 4C:
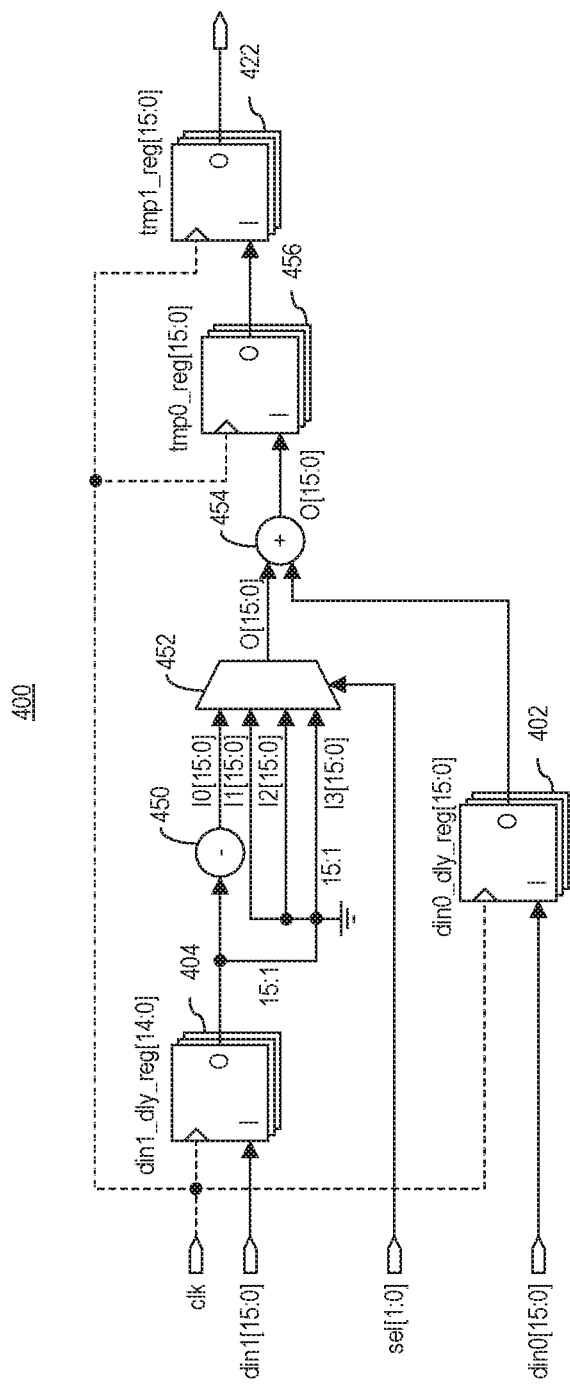

FIGS. 4A, 4B, and 4C depict circuit designs illustrating example operative features of the system of FIG. 1. FIG. 4A illustrates an example circuit design 400 prior to application of optimization operations as performed by system 100 of FIG. 1. FIG. 4B illustrates the state of circuit design 400 after performing a masking operation performed by system 100. FIG. 4C illustrates the state of circuit design 300 subsequent to application of the optimization operations performed by system 100.

In the example of FIG. 4A, circuit design 400 includes registers 402 coupled to adder 406 and subtractor 408. Registers 404 are coupled to adder 406, subtractor 408, and to registers 414. Adder 406 and subtractor 408 are coupled to multiplexer 410. The output of multiplexer 410 is coupled to registers 412. Registers 412 are coupled to subtractor 416 and to adder 418. Registers 414 are coupled to subtractor 416 and to adder 418. The subtractor 416 and adder 418 are coupled to multiplexer 420. The output of multiplexer 420 is coupled to registers 422. The select signal is provided to registers 424. Registers 424 drive the select signal of multiplexer 410 and multiplexer 420.

In the example of FIG. 4A, starting from the output dout[15:0], the system detects a re-convergent section by detecting segment 2 followed by one or more other consecutive segments such as segment 1. Segment 2 is defined by a segment end sequential circuit element corresponding to registers 422 and a segment start sequential circuit element corresponding to registers 412 and 414. Segment 1 is defined by a segment end sequential circuit element corresponding to registers 412 and 414 (e.g., the segment start sequential circuit element of segment 2) and a segment start sequential circuit element corresponding to registers 402 and 404. Segment 1 includes adders 406 and subtractors 408, followed by subtractor 416 and adder 418 in segment 2. Subtractors 416 and adders 418 are chosen based on the select signal.

In one aspect, the system is capable of traversing the input pins of the segment end sequential circuit element (422) backwards through circuit design 400. In the example of FIG. 4A, registers 422 are the segment end sequential circuit element as well as the end sequential circuit element of the re-convergent section. The system is capable of identifying multiplexers within the data signal paths. Multiplexers are indicative of re-convergent paths in circuit design 400. In the example of FIG. 4A, the system traverses the input pins of registers 422 backwards to detect multiplexer 420 and continues to detect registers 412 and 414. Registers 412 and 414 are the segment start sequential circuit elements of segment 2.

The system continues traversing the input pins of registers 412 and 414 backward through circuit design 400. Registers 412 and 414 serve as both the segment end sequential circuit elements of segment 1 and the segment start sequential circuit elements of segment 2. In traversing backward, the system detects multiplexer 410 and continues to then detect registers 402 and registers 404. Registers 402 and registers 404 are the segment start sequential circuit elements of segment 1 and also the start sequential circuit elements of the re-convergent section.

For purposes of illustration, the system determines that registers 402 and 404 mark the start of the re-convergent section. In one example, the system continues traversing beyond registers 402 and 404 down in next consecutive segment and detects a stopping condition such as the segment including no re-convergent paths, the segment having more inputs than outputs, or both. Other stopping conditions may also be used such as stopping after a predetermined number of segments (e.g., limiting the number of segments in a re-convergent section).

In the example of FIG. 4A, the re-convergent section has more inputs (e.g., 32 input registers or "inputs" corresponding to registers 402, 404) than outputs (e.g., 16 output registers or "outputs" corresponding to registers 422). Each of segments 1 and 2 include signal paths that converge. Further, in looking at segments 1 and 2 individually, segment 1 has the same number of inputs (e.g., 32 corresponding to registers 402, 404) as outputs (e.g., 32 output registers or "outputs" corresponding to registers 412, 414); and segment 2 has more inputs (e.g., 32 corresponding to registers 412, 414) than outputs (e.g., 16 corresponding to registers 422).

The system is capable of masking each sequential circuit element of circuit design 400 located between the end sequential circuit element(s) and the start sequential circuit element(s) of the re-convergent section. In one aspect, the system is capable of masking each sequential circuit element of circuit design 400 located between the start sequential circuit element(s) and the end sequential circuit element(s) of the re-convergent section. The system may apply the masking operation only to the data signal paths and not to the signal paths corresponding to select signals. Referring to the example of FIG. 4A, the system masks registers 412 and 414, but not registers 422, 402, and 404 corresponding to start and end synchronous circuit elements, and not registers 404 corresponding to the select signal path.

FIG. 4B illustrates an example implementation of circuit design 400 after performing the masking. It should be appreciated that as part of performing the masking, the system is capable of determining timing of the signal paths prior to the masking and persisting that information for later use and/or recall. Further, the system is capable of storing the location of each of the synchronous circuit elements removed from circuit design 400. FIG. 4B illustrates that segments 1 and 2 have been effectively merged into a single, larger segment for purposes of optimization.

Once synchronous circuit elements separating segments (e.g., registers 412, 414) are masked, the system is capable of performing one or more optimization operations on the combinatorial logic of the re-convergent section. For example, the system may perform Boolean logic optimizations to reduce the amount of circuitry included in the re-convergent section. In the example of FIG. 4B, the system is capable of applying the optimization operations across the entirety of the re-convergent section. This means that the system applies the optimization operations on all combinatorial circuitry between the start synchronous circuit elements (registers 402, 404) and the end synchronous circuit elements (registers 422).

Were conventional synthesis techniques to be used, the system would attempt to apply optimization operations only to segment 2 and then separately and independently to segment 1. With the conventional approach, the degree of optimization obtained in the reduction in size in the circuitry would be less than that achievable by masking registers 412 and 414 and treating segment 1 and segment 2 as one large section available for optimization operations. The system is further capable of mapping the optimized combinatorial logic of the re-convergent section. The system may also modify the re-convergent section subsequent to the mapping to match a latency of the re-convergent section that which existed prior to the masking.

FIG. 4C illustrates an example of circuit design 400 subsequent to optimizations performed by synthesis tool 102. In the example of FIG. 4C, register 404 is coupled to subtractor 450. Subtractor 450 is coupled to multiplexer 452. Multiplexer 452 is a 4:1 multiplexer. Multiplexer 452 is coupled to adder 454. Adder 454 is coupled to registers 456. Registers 456 are coupled to registers 422. Circuit design 400 of FIG. 4C may be implemented using less combinatorial logic and fewer registers than circuit design 400 of FIG. 4A and, as such, is reduced in size relative to circuit design 400 of FIG. 4A. For example, the number of registers is reduced from 82 in the example of FIG. 4A to 62 in the example of FIG. 4C. As discussed, the number of registers and amount of combinatorial logic used to implement each of the various example circuits described within this disclosure may vary based on a variety of factors including, but not limited to, the particular implementation tools used and/or the architecture of the target IC. Still, the examples illustrate the reduction in area that may be achieved.

The combinatorial logic has been optimized across two segments to use a 4:1 multiplexer and a 2-bit select signal. While registers 402, 404, and 422 of the data signal paths remain in the circuit design, other circuit elements such as registers adders 406, 418; subtractors 408, 416; registers 412, 414; and multiplexers 410, 420 have been removed and replaced with subtractor 450, multiplexer 452, and adder 454 via the optimization operations performed on combinatorial logic subsequent to masking.

Registers 456 have been added to ensure that the timing, e.g., latency, of circuit design 400 of FIG. 4C has the same timing as circuit design 400 of FIG. 4A. In the example of FIG. 4C, the inserted registers are inserted at the end, e.g., the output, of the optimized combinatorial logic and prior to the end sequential circuit element of the re-convergent section (e.g., the right-most register(s)). The system further ensures that timing (e.g., latency) of the select signal paths matches that of the original circuit design prior to performing the optimization operations.

Figure 5A:
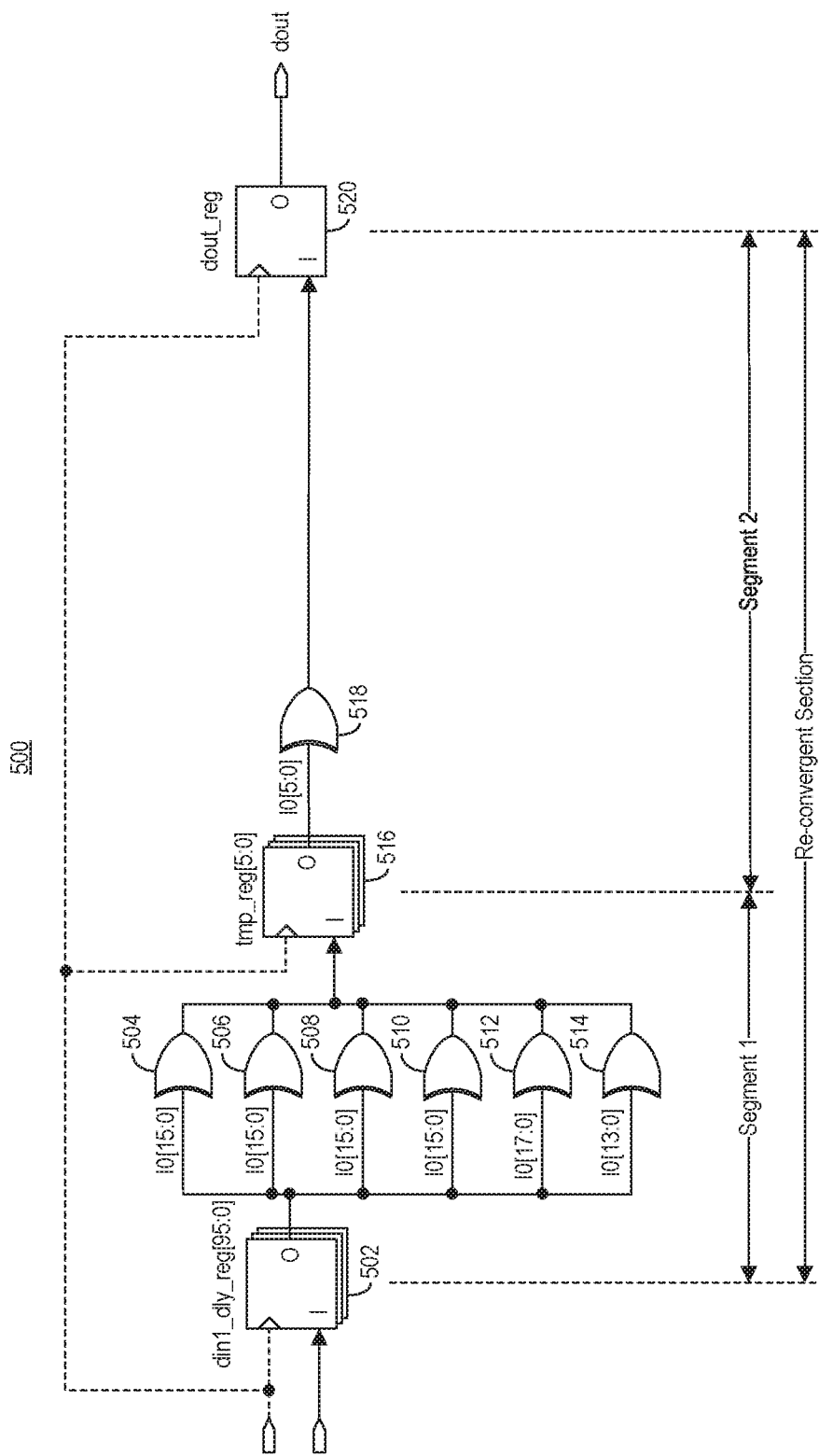
FIGS. 5A and 5B depict circuit designs illustrating example operative features of the system of FIG. 1.
Figure 5B:
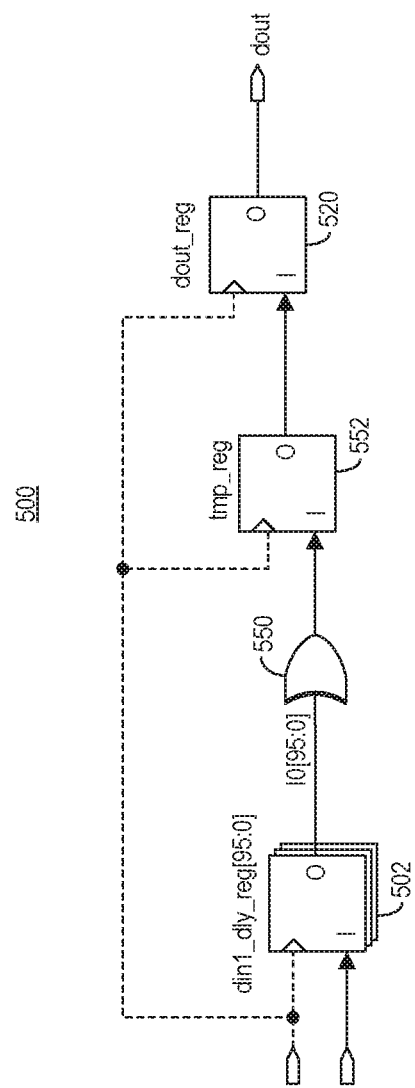

FIGS. 5A and 5B depict circuit designs illustrating example operative features of the system of FIG. 1. FIG. 5A illustrates the state of circuit design 500 prior to application of the optimization operations described herein. In the example of FIG. 5A, registers 502 are coupled to exclusive OR (XOR) gates 504, 506, 508, 510, 512, and 514. XOR gates 504-504 are coupled to registers 516. Registers 516 are coupled to XOR gate 518. XOR gate 518 is coupled to register 520.

In the example of FIG. 5A, segment 2 is defined by a segment end sequential circuit element corresponding to register 520 and a segment start sequential circuit element corresponding to registers 516. Segment 1 is defined by a segment end sequential circuit element corresponding to registers 516 (e.g., the segment start sequential circuit element of segment 2) and a segment start sequential circuit element corresponding to registers 502. Segment 1 includes XOR gates 504-514, followed by XOR gate 518 in segment 2. During the masking, the system is capable of masking registers 516.

FIG. 5B illustrates the state of circuit design 500 subsequent to application of the optimization operations. As pictured, circuit design 500 of FIG. 5B includes registers 502 and register 520. Register 552 is added for purposes of balancing latency. XOR gate 550 is added. XOR gates 504-514, XOR gate 518, and registers 516 have been removed.

Circuit design 500 of FIG. 5B may be implemented using less combinatorial logic and fewer registers than circuit design 500 of FIG. 5A and, as such, is reduced in size relative to circuit design 500 of FIG. 5A. For example, the number of registers is reduced from 101 in the example of FIG. 5A to 97 in the example of FIG. 5B. As discussed, the number of registers and amount of combinatorial logic used to implement each of the various example circuits described within this disclosure may vary based on a variety of factors including, but not limited to, the particular implementation tools used and/or the architecture of the target IC. Still, the examples illustrate the reduction in area that may be achieved.

Figure 6:
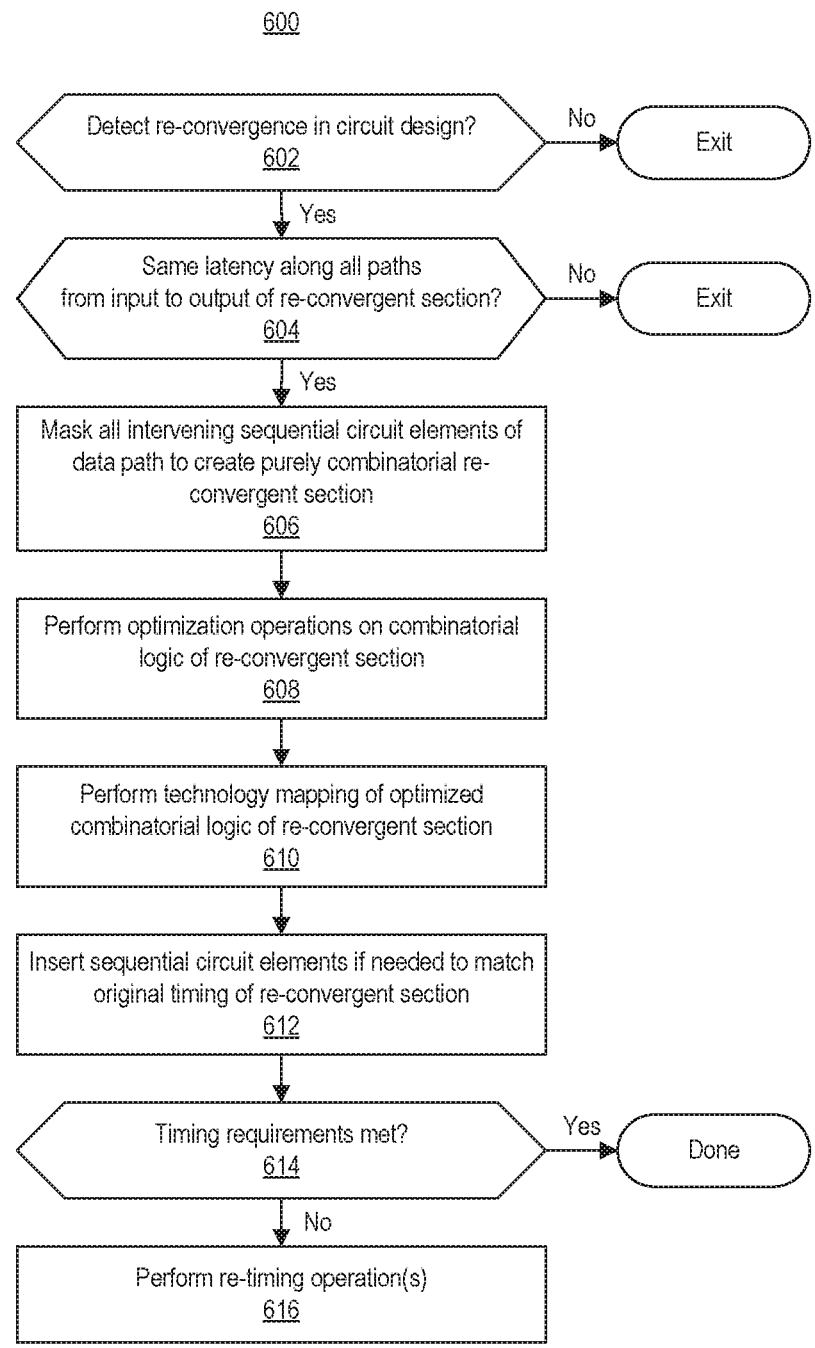
FIG. 6 illustrates another example method of performing certain operative features of the system of FIG. 1.

FIG. 6 illustrates a method 600 of performing certain operative features of the system of FIG. 1. FIG. 6 illustrates example operations performed by synthesis tool 102 of FIG. 1.

In block 602, the system determines whether re-convergence is detected in the circuit design. For example, the system is capable of traversing data signal paths of the circuit design backwards from outputs to inputs to detect two or more consecutive segments that form a re-convergent section. As noted, the number of outputs of a re-convergent section are fewer than the number of inputs. The system is capable of detecting a re-convergent section by detecting consecutive segments where each segment has one or more of the following characteristics: the segment has fewer outputs than inputs; the segment includes two or more signal paths that merge to fewer signal paths; and/or the segment has a same number of inputs as outputs regardless of whether two or more signal paths therein merge. Appreciably, at least one segment of the plurality of consecutive segments forming a re-convergent section will have fewer outputs than inputs. The system may use any of the various stopping conditions described herein to when detecting the re-convergent section and/or to limit the size of the re-convergent section. In response to determining that no re-convergence is detected within the circuit design, method 600 exits. In response to detecting re-convergence within the circuit design, e.g., detecting a re-convergent section, method 600 continues to block 604.

In block 604, the system checks whether the latency (e.g., timing) along each (e.g., all) signal paths of the determined re-convergent section is the same. For example, the system traverses backward from each input pin of each end sequential circuit element of the re-convergent section back to the inputs of the re-convergent section to ensure that the latency along each signal path (e.g., both data and select signals) is the same. In response to verifying that the latency of all signal paths of the re-convergent section is the same, method 600 continues to block 606. In response to determining that the latency along all signal paths of the re-convergent section is not the same, method 600 exits.

In block 606, the system is capable of masking the sequential circuit elements in data signal paths of the re-convergent section located between the start and end synchronous circuit elements of the re-convergent section. The system effectively removes intervening synchronous circuit elements along the data signal paths between start and end synchronous circuit elements of the re-convergent section. This operation creates a re-convergent section that is formed of purely combinatorial logic at least with regard to data signal paths. In performing the masking, the system is capable of ignoring any sequential circuit elements within the re-convergent section that receive or output select signals provided to multiplexers. As discussed, the system masks all of the sequential circuit elements of the re-convergent section not on a signal path that is a select signal, not a start sequential circuit element, and not an end sequential circuit element. The masking operation of effectively combines the various consecutive segments that form the re-convergent section into one larger segment bounded by sequential circuit elements and having only combinatorial logic between the bounding sequential circuit elements.

In block 608, the system is capable of performing one or more optimization operations on the combinatorial logic of the re-convergent section. For example, the system is capable of performing one or more Boolean minimization optimizations to simplify the Boolean expression implemented by the combinatorial logic of the re-convergent section.

In block 610, the system is capable of performing technology mapping of the optimized combinatorial logic of the re-convergent section. In block 612, the system is capable of inserting one or more sequential circuit elements if needed to match the original timing (e.g., latency) of the various signal paths of the re-convergent section. For each signal path that requires insertion of one or more synchronous circuit elements to match timing, the system inserts the synchronous circuit elements at the output of the optimized combinatorial logic and prior to the end synchronous circuit element of the re-convergent section. Referring to FIG. 3C, for example, registers 326 are inserted between the output of multiplexer 324 and the input of registers 322. Referring to the example of FIG. 4C, for example, registers 456 are inserted after the output of adder 454 and prior to the inputs of registers 422.

In block 614, the system is capable of performing a timing analysis to determine whether the timing requirements of the circuit design are met after applying the optimization operations and remapping of the re-convergent section of the circuit design. In response to determining that the timing requirements are met, method 600 can end. In response to determining that the timing requirements are not met, method 600 proceeds to block 616 where one or more retiming operations may be performed which may relocate synchronous circuit elements within the re-convergent section to improve timing.

In another aspect, in cases where the system is unable to optimize the circuit design in a manner that meets the timing requirements of the circuit design, the system may restore the circuit design to its original state, e.g., as the circuit design existed prior to commencement of method 600.

The inventive arrangements described within this disclosure provide a technique for reducing the area consumed by a circuit design. The inventive arrangements may be applied to any of a variety of different circuit designs intended for implementation within various types of ICs. The techniques described within this disclosure may be applied to circuit designs intended for implementation in hardwired ICs (e.g., ASICs), ICs that include programmable circuitry or logic, or ICs that include a combination of hardwired circuitry and programmable circuitry or logic.

Figure 7:
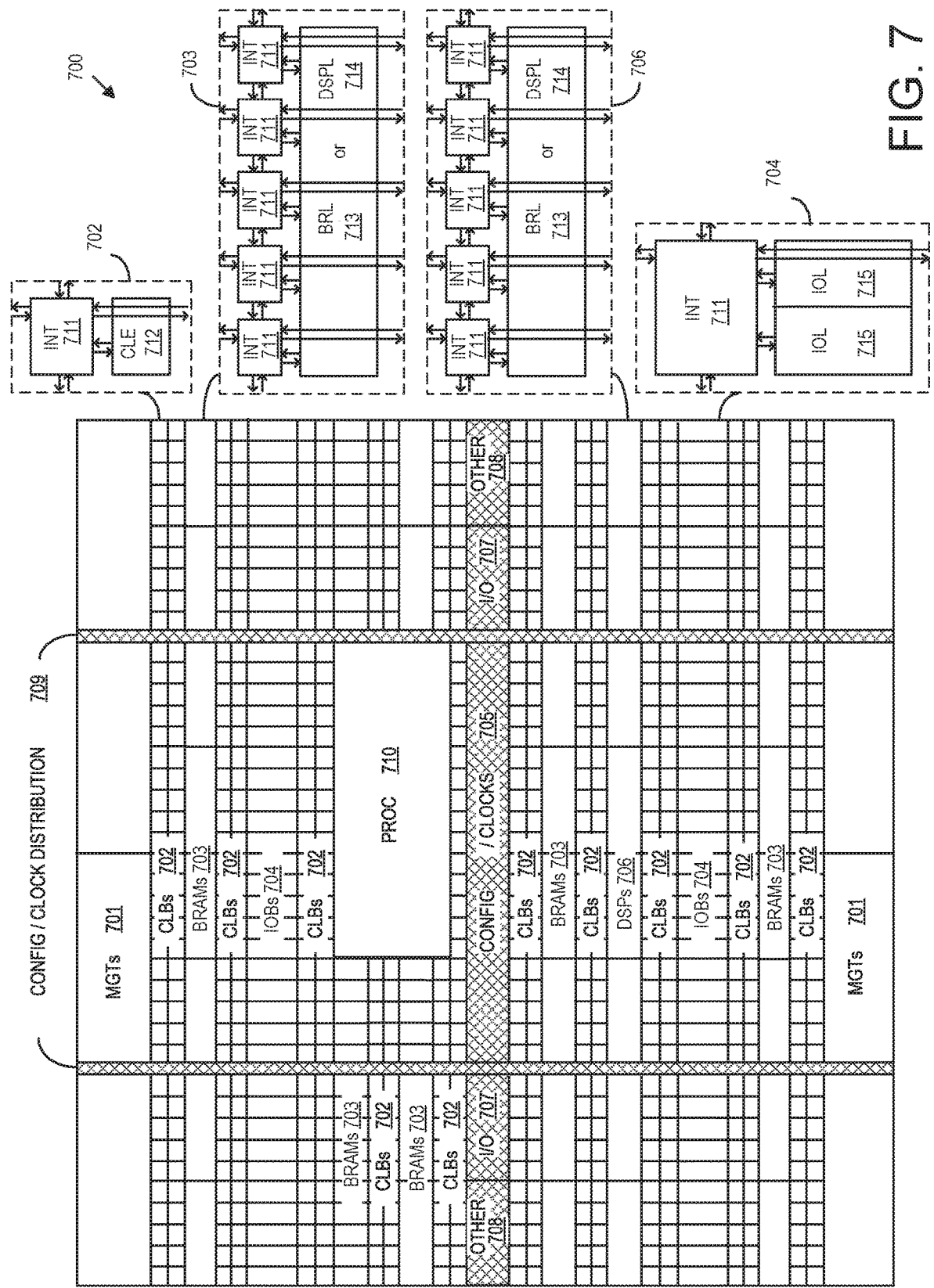
FIG. 7 illustrates an example architecture for an IC.

FIG. 7 illustrates an example architecture 700 for an IC. In one aspect, architecture 700 may be implemented within a programmable IC. For example, architecture 700 may be used to implement a field programmable gate array (FPGA). Architecture 700 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

While FIG. 7 is provided as an example of an IC architecture that may be used with the inventive arrangements described herein, as noted, the inventive arrangements may be applied to circuit designs meeting the various metrics described herein relating to detecting re-convergent sections that are intended for implementation in any of a variety of different types of ICs. In this regard, the inventive arrangements are not limited to use with programmable ICs.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the right of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a horizontal area near the center of the die, e.g., formed of regions 705, 707, and 708, may be used for configuration, clock, and other control logic. Vertical areas 709 extending from this horizontal area may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" or "programmable logic" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

A system as described herein in connection with FIG. 1, for example, is capable of further processing a circuit design having undergone the processing described herein for implementation within an IC having an architecture the same as or similar to that of FIG. 7. The system, for example, is capable of synthesizing, placing, and routing the circuit design. The system may also perform bitstream generation so that the bitstream may be loaded into the IC, thereby physically implementing the circuit design within the IC.

Figure 8:
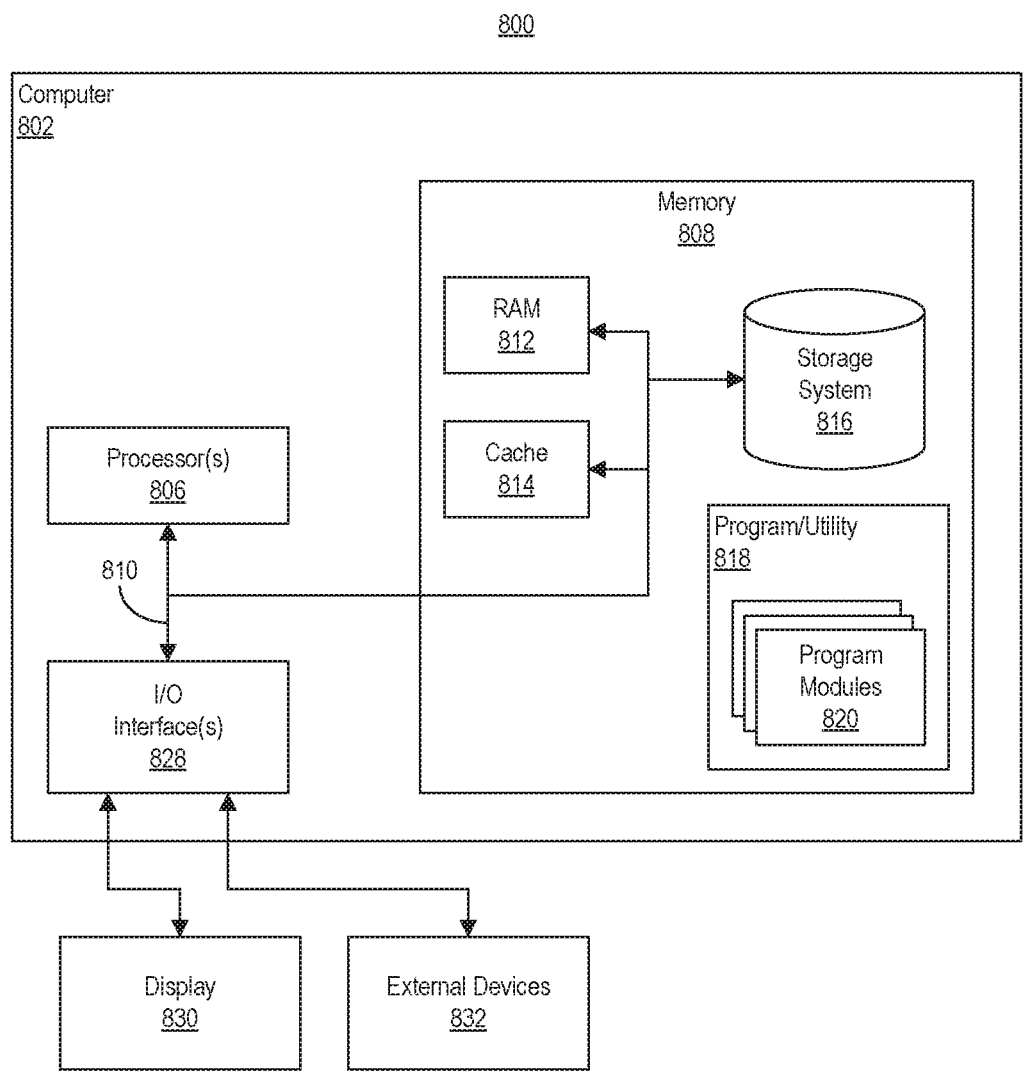
FIG. 8 illustrates an example computing environment for use with the inventive arrangements described within this disclosure.

FIG. 8 illustrates an example computing environment 800 for use with the inventive arrangements described within this disclosure. The computing environment includes a computer 802. The components of computer 802 may include, but are not limited to, one or more processors 806 (e.g., central processing units), a memory 808, and a bus 810 that couples various system components including memory 808 to processor(s) 806. Processor(s) 806 may include any of a variety of processors that are capable of executing program code. Example processor types include, but are not limited to, processors having an x86 type of architecture (IA-32, IA-64, etc.), a Power Architecture, ARM processors, and the like.

Bus 810 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 802 typically includes a variety of computer readable media. Such media may be any available media that is accessible by computer 802 and may include any combination of volatile media, non-volatile media, removable media, and/or non-removable media.

Memory 808 may include computer readable media in the form of volatile memory, such as random-access memory (RAM) 812 and/or cache memory 814. Computer 802 may also include other removable/non-removable, volatile/non-volatile computer system storage media. By way of example, storage system 816 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 810 by one or more data media interfaces. As will be further depicted and described below, memory 808 may include at least one computer program product having a set (e.g., at least one) of program modules (e.g., program code) that are configured to carry out the functions and/or operations described within this disclosure.

For example, program/utility 818, having a set (at least one) of program modules 820 which may include, but are not limited to, an operating system, one or more application programs (e.g., user applications such as system 100 of FIG. 1), other program modules, and/or program data, is stored in memory 808. Program modules 820 generally carry out the functions and/or methodologies as described herein at least with respect to operations performed by computer 802.

Program/utility 818 is executable by processor(s) 806. Program/utility 818 and any data items used, generated, and/or operated upon by processor(s) 806 are functional data structures that impart functionality when employed by processor(s) 806. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 802 may include one or more Input/Output (I/O) interfaces 828 communicatively linked to bus 810. I/O interface(s) 828 allow computer 802 to communicate with various devices such as display 830 and/or other external devices 832. External devices 832, for example, allow user(s) to interact with computer 802, couple to external devices that allow computer 802 to communicate with other computing devices, and the like. Examples of external devices 832 may include, but are not limited to, a keyboard (not shown), a pointing device, or the like. Examples of I/O interfaces 828 may include, but are not limited to, network cards, modems, network adapters, hardware controllers, etc.

FIG. 8 is not intended to suggest any limitation as to the scope of use or functionality of the examples described herein. Computer 802 is an example of computer hardware (e.g., a system) that is capable of performing the various operations described within this disclosure.

Computer 802 is only one example implementation of a data processing system and/or computer hardware. Computer 802 is shown in the form of a computing device, e.g., a computer or server. Computer 802 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Computer 802 is operational with numerous other general-purpose or special-purpose computing system environments or configurations. Examples of computing systems, environments, and/or configurations that may be suitable for use with computer 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 802 is also an example implementation of an EDA system. Program modules 820, for example, may include software that is capable of performing a design flow (e.g., synthesis, placement, routing, and/or bitstream generation) on a circuit design. In this regard, computer 802 serves as an example of an EDA system such as system 100 of FIG. 1 that is capable of performing operations described herein. In the case of programmable ICs, such a system is capable of generating configuration bitstreams and loading the configuration bitstreams into the IC to implement circuitry therein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include detecting, using computer hardware, a re-convergent section of a circuit design, masking, using the computer hardware, a sequential circuit element of the re-convergent section located between a start and an end of the re-convergent section, and performing, using the computer hardware, an optimization operation on combinatorial logic of the re-convergent section to create optimized combinatorial logic. The method can include mapping, using the computer hardware, the optimized combinatorial logic of the re-convergent section and modifying, using the computer hardware, the re-convergent section subsequent to the mapping to match timing of the re-convergent section prior to the masking.

The foregoing and other implementations can each optionally include one or more of the following features, alone or in combination. Some example implementations include all the following features in combination.

In an aspect, the modifying includes inserting at least one sequential circuit element following the optimized combinatorial logic and prior to the end of the re-convergent section.

In an aspect, the method can include determining that timing of each signal path of the re-convergent section is equivalent.

In another aspect, the re-convergent section includes a plurality of consecutive segments.

In another aspect, the method can include retiming the re-convergent section in response to determining that a timing requirement corresponding to the re-convergent section is not met.

In another aspect, the masking results in the re-convergent section including only combinatorial logic between the start and the end of the re-convergent section.

In another aspect, the detecting the re-convergent section of the circuit design includes traversing signal paths of the circuit design and detecting a plurality of consecutive segments of the circuit design forming the re-convergent section.

In another aspect, a system having a processor is capable of initiating and/or performing the various operations described within this disclosure. In still another aspect, a computer program product includes one or more computer readable storage media, and program instructions collectively stored on the one or more computer readable storage media, wherein the program instructions are executable by computer hardware to initiate the various operations described within this disclosure.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   detecting, using computer hardware, a re-convergent section of a circuit design;
   masking, using the computer hardware, a sequential circuit element of the re-convergent section located between a start and an end of the re-convergent section;
   performing, using the computer hardware, an optimization operation on combinatorial logic of the re-convergent section to create optimized combinatorial logic;
   mapping, using the computer hardware, the optimized combinatorial logic of the re-convergent section; and
   modifying, using the computer hardware, the re-convergent section subsequent to the mapping to match timing of the re-convergent section prior to the masking.

2. The method of claim 1, wherein the modifying includes inserting at least one sequential circuit element following the optimized combinatorial logic and prior to the end of the re-convergent section.

3. The method of claim 1, further comprising:
   determining that timing of each signal path of the re-convergent section is equivalent.

4. The method of claim 1, wherein the re-convergent section includes a plurality of consecutive segments.

5. The method of claim 1, further comprising:
   retiming the re-convergent section in response to determining that a timing requirement corresponding to the re-convergent section is not met.

6. The method of claim 1, wherein the masking results in the re-convergent section including only combinatorial logic between the start and the end of the re-convergent section.

7. The method of claim 1, wherein the detecting the re-convergent section of the circuit design includes:
   traversing signal paths of the circuit design and detecting a plurality of consecutive segments of the circuit design forming the re-convergent section.

8. A system, comprising:
   a processor configured to initiate operations including:
   detecting a re-convergent section of a circuit design;
   masking a sequential circuit element of the re-convergent section located between a start and an end of the re-convergent section;
   performing an optimization operation on combinatorial logic of the re-convergent section to create optimized combinatorial logic;
   mapping the optimized combinatorial logic of the re-convergent section; and
   modifying the re-convergent section subsequent to the mapping to match timing of the re-convergent section prior to the masking.

9. The system of claim 8, wherein the modifying includes inserting at least one sequential circuit element following the optimized combinatorial logic and prior to the end of the re-convergent section.

10. The system of claim 8, wherein the processor is configured to initiate operations including:
    determining that timing of each signal path of the re-convergent section is equivalent.

11. The system of claim 8, wherein the re-convergent section includes a plurality of consecutive segments.

12. The system of claim 8, wherein the processor is configured to initiate operations including:
    retiming the re-convergent section in response to determining that a timing requirement corresponding to the re-convergent section is not met.

13. The system of claim 8, wherein the masking results in the re-convergent section including only combinatorial logic between the start and the end of the re-convergent section.

14. The system of claim 8, wherein the detecting the re-convergent section of the circuit design includes:
    traversing signal paths of the circuit design and detecting a plurality of consecutive segments of the circuit design forming the re-convergent section.

15. A computer program product, comprising:
    one or more computer readable storage media, and program instructions collectively stored on the one or more computer readable storage media, wherein the program instructions are executable by computer hardware to initiate operations including:

detecting a re-convergent section of a circuit design;

masking a sequential circuit element of the re-convergent section located between a start and an end of the re-convergent section;

performing an optimization operation on combinatorial logic of the re-convergent section to create optimized combinatorial logic;

mapping the optimized combinatorial logic of the re-convergent section; and modifying the re-convergent section subsequent to the mapping to match timing of the re-convergent section prior to the masking.

16. The computer program product of claim 15, wherein the modifying includes inserting at least one sequential circuit element following the optimized combinatorial logic and prior to the end of the re-convergent section.

17. The computer program product of claim 15, wherein the program instructions are executable by the computer hardware to initiate operations including:

determining that timing of each signal path of the re-convergent section is equivalent.

18. The computer program product of claim 15, wherein the re-convergent section includes a plurality of consecutive segments.

19. The computer program product of claim 15, wherein the program instructions are executable by the computer hardware to initiate operations including:

retiming the re-convergent section in response to determining that a timing requirement corresponding to the re-convergent section is not met.

20. The computer program product of claim 15, wherein the masking results in the re-convergent section including only combinatorial logic between the start and the end of the re-convergent section.

\* \* \* \* \*